US006184846B1

(12) United States Patent
Myers et al.

(10) Patent No.: US 6,184,846 B1
(45) Date of Patent: Feb. 6, 2001

(54) LOOP CONDUCTOR ANTENNA FOR FUEL DISPENSER

(75) Inventors: Howard M. Myers; Dolan F. Blalock; Roger W. Stout, all of Greensboro; Joshua D. Wyatt, Winston-Salem, all of NC (US)

(73) Assignee: Marconi Commerce Systems Inc., Greensboro, NC (US)

( * ) Notice: Under 35 U.S.C. 154(b), the term of this patent shall be extended for 0 days.

(21) Appl. No.: 09/497,306

(22) Filed: Feb. 3, 2000

(51) Int. Cl.[7] .............................. G06F 17/60; H01Q 1/38

(52) U.S. Cl. ............................ 343/895; 141/94; 141/351; 340/825.72; 222/192

(58) Field of Search .................................... 343/866, 741, 343/867, 742, 895; 141/94, 351; 222/192

(56) References Cited

U.S. PATENT DOCUMENTS

| | | | | |
|---|---|---|---|---|
| 2,401,472 | | 6/1946 | Franklin | 250/14 |
| 2,551,664 | | 5/1951 | Galper | 250/33 |
| 3,560,983 | * | 2/1971 | Willie et al. | 343/866 |
| 3,919,704 | | 11/1975 | Williams et al. | 340/280 |
| 4,804,695 | | 2/1989 | Horton | 524/27 |
| 4,914,448 | | 4/1990 | Otsuka et al. | 343/872 |
| 4,914,449 | | 4/1990 | Fukuzawa et al. | 343/872 |
| 4,940,992 | | 7/1990 | Nguyen et al. | 343/803 |
| 5,361,061 | | 11/1994 | Mays et al. | 340/825.44 |
| 5,373,303 | | 12/1994 | D'Hont | 343/788 |
| 5,455,596 | | 10/1995 | Higashiguichi et al. | 343/741 |
| 5,469,178 | | 11/1995 | Nguyen et al. | 343/702 |
| 5,491,483 | | 2/1996 | D'Hont | 342/42 |
| 5,555,459 | | 9/1996 | Kraus et al. | 343/702 |
| 5,557,279 | | 9/1996 | D'Hont | 342/42 |
| 5,574,470 | | 11/1996 | de Vall | 343/895 |
| 5,594,448 | | 1/1997 | D'Hont | 342/44 |
| 5,598,032 | * | 1/1997 | Fidalgo | 257/679 |
| 5,619,207 | | 4/1997 | D'Hont | 342/42 |
| 5,621,411 | | 4/1997 | Hagl et al. | 342/42 |
| 5,629,712 | | 5/1997 | Adrian et al. | 343/713 |
| 5,675,342 | | 10/1997 | Sharpe | 342/42 |
| 5,691,731 | | 11/1997 | Van Erven | 343/742 |
| 5,694,139 | | 12/1997 | Saito et al. | 343/866 |
| 5,701,127 | | 12/1997 | Sharpe | 342/42 |
| 5,714,937 | | 2/1998 | Campana, Jr. | 340/573 |
| 5,732,579 | | 3/1998 | D'Hont et al. | 70/278 |
| 5,760,747 | | 6/1998 | McCoy et al. | 343/728 |
| 5,906,228 | | 5/1999 | Keller | 141/94 |
| 5,969,691 | * | 10/1999 | Myers | 343/834 |

* cited by examiner

*Primary Examiner*—Don Wong
*Assistant Examiner*—James Clinger
(74) *Attorney, Agent, or Firm*—Coats & Bennett, P.L.L.C.

(57) ABSTRACT

A fuel dispenser includes an overbody within which a wide, flat conductor acts as a loop antenna. The conductor is concentrically coiled to create a plurality of turns comparable in appearance to a coiled tape measure. The antenna is then molded into a panel or overbody and affixed to the fuel dispenser to present a visually pleasing appearance.

39 Claims, 9 Drawing Sheets

LOOP CONDUCTOR ANTENNA FOR FUEL DISPENSER

FIELD OF THE INVENTION

This invention pertains to a loop antenna for placement within a fuel dispenser housing face to facilitate automatic financial transactions.

BACKGROUND OF THE INVENTION

Fuel dispensing environments have been evolving rapidly with the introduction and development of wireless technology and integrated transaction services. Customers rapidly grew to accept and even demand "pay-at-the-pump" technology wherein a customer did not have to enter the gas station building, but merely had to insert a credit card or debit card into a magnetic card reader on the fuel dispenser. The fuel dispenser was then connected to a remote network, which would secure authorization for the transaction and provide the appropriate cost information to the financial institution so that the account could be properly charged. More advanced units also include cash acceptors which allow a customer to insert cash, in either change or bill form, into the fuel dispenser to pay for the fuel purchased. These cash acceptors work much like conventional vending machines and may provide change. In either situation, a magnetic card reader or a cash acceptor, the customer still had to perform the additional step of interacting with the fuel dispenser to purchase the fuel or other goods and services.

The next improvement on this payment facilitation technology was the concept of wireless transactions. The customer would mount a transponder on a card or, later, a vehicle for identification purposes. Typically, the identification information would be coupled with financial account information, either a credit card account, a debit card account or the like. Two antennas were mounted on the top of the fuel dispenser. The first antenna would "ping" the transponder on the vehicle at a first radio frequency, in effect asking, "who are you?" The transponder in the card or on the vehicle would respond on a different radio frequency, stating, in effect, "I am an authorized user and have money to spend to purchase fuel, please authorize me to purchase fuel." Additional information could also be conveyed. The fuel dispenser would then verify the identification information sent by the transponder, typically over a remote network, and then the fuel transaction would proceed. An example of such an arrangement is seen in the S5000 system sold by the TIRIS division of Texas Instruments.

This communication was implemented by providing a forward link to the transponder by way of an inductive loop transmitting at approximately 134 kHz. This forward link antenna, is typically an oblong coil of wire (about 6 or 7 turns) positioned above the fueling area and more typically over the fuel dispenser. The return link typically operates in the range of 900 MHz and usually requires a second whip antenna. The transmitting loop antennas have a directive pattern that is in the form of lobes radiating out the front and back of the loop. Both antennas must have their radiation patterns situated in a manner that allows both patterns to link with the transponder. In general, the forward link is more important than the return link, since the forward link is a magnetic field, which tends to fall off quicker with distance as is well understood.

The above described arrangement eliminates the need for the customer to perform the step of interacting with the fuel dispenser for the financial part of the transaction, although in the conventional transponder implementation, the transponder had to be brought relatively close to the dispenser to be "pinged." The customer must then merely lift the nozzle, insert it in the gas tank of the vehicle, select the fuel grade, dispense the fuel and then return the nozzle to its cradle. All of the financial transactions are taken care of automatically.

One of the problems with this approach was the need for the antennas on the fuel dispensers. Because this technology is in hot demand, vendors have to retrofit existing fuel dispensers with antennas to perform these functions. The initial solution mounted a loop antenna on the top of the fuel dispenser. While this arrangement performed adequately, these loop antennas were unsightly. Additionally, these antennas directly conflict with existing signage and decoration panels mounted at the top of many existing dispensers.

Thus there remains a need for an antenna which is easily retrofitted onto fuel dispensers already deployed into the field and which is aesthetically appealing and does not conflict with existing advertising signs.

SUMMARY OF THE INVENTION

The aforesaid concerns are addressed by providing an enhanced radiation loop in a molded package. The loop radiation characteristics are enhanced by the use of a low loss loop constructed of several turns of a flat conductive metal band, such as aluminum or copper, arranged in a concentric coil. The loop is preferably embedded in a molded overbody for the fuel dispenser. The overbody acts as an insulation layer, includes a plurality of fasteners or fastener receptacles, and is molded to present a cosmetically pleasing integration of the antenna assembly onto the front face of an existing fuel dispenser. The antenna is sized to optimize emissions at a desired frequency as is well understood. The overbody is preferably formed from a suitable dielectric material to insulate the antenna, yet still allow transmission of electromagnetic waves therethrough at the desired frequency. Care must be taken in the choice of materials in light of the petroleum product environment in which the overbody will function. However, materials resistant to degradation in the presence of petroleum products are well known in the art.

In the preferred embodiment, the loop antenna is formed from one turn of aluminum tubing. Aluminum is preferred because of its corrosion-resistant properties in an outdoor environment. Further, one turn has been determined to yield very good results while eliminating some of the molding concerns present with multiple turns.

DETAILED DESCRIPTION OF THE PREFERRED EMBODIMENT

Figure 9:
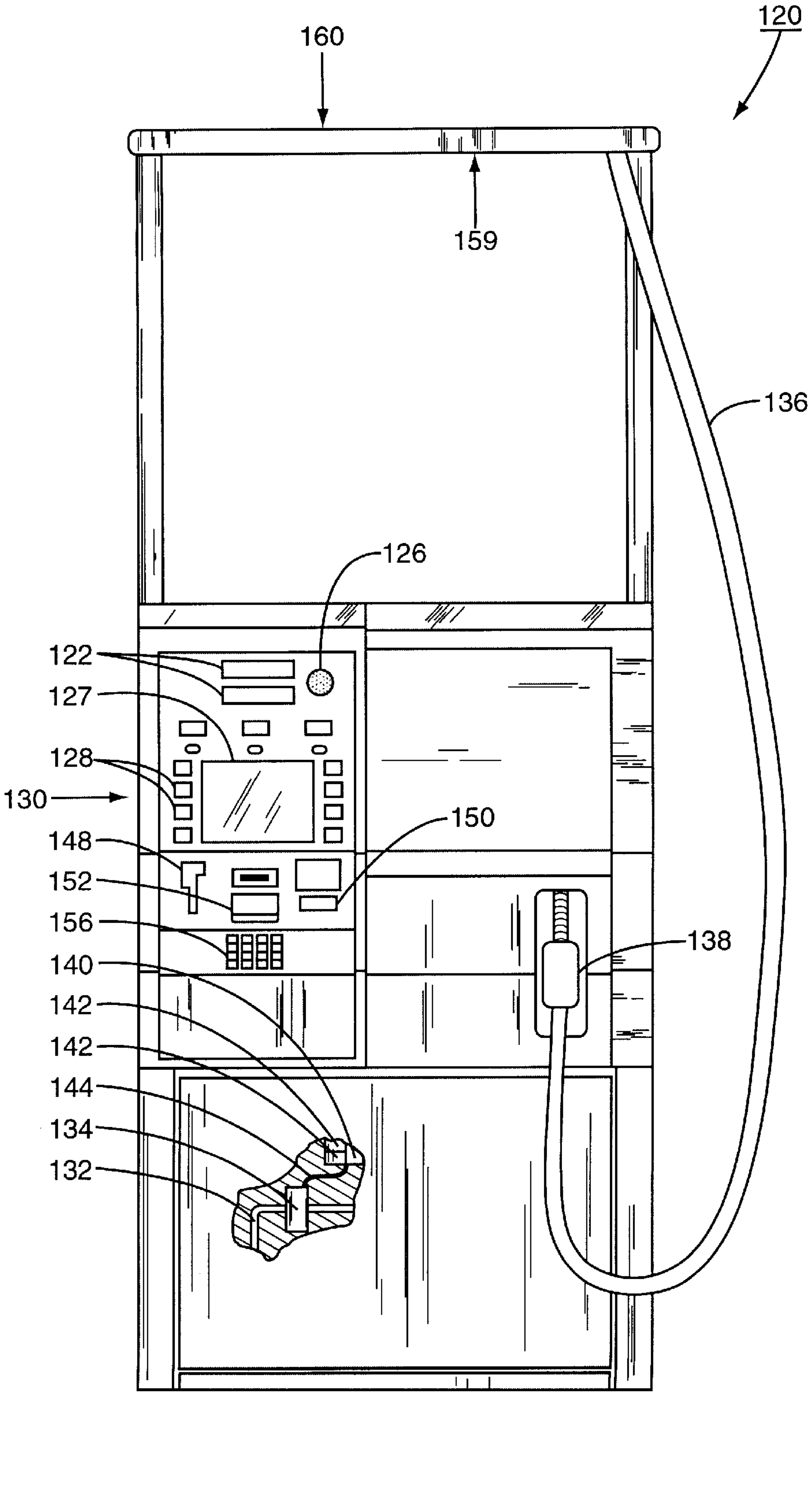
FIG. 9 PRIOR ART
FIG. 9 demonstrates a front elevational view of a prior art fuel dispenser.

Turning now to the drawings, FIG. 9 shows a prior art fuel dispenser 120 with face 130. The fuel dispenser 120 provides a fuel delivery path from an underground storage tank (not shown) to a vehicle (not shown). The delivery path includes a fuel delivery line 132 having a fuel metering device 134. The fuel delivery line 132 communicates with a fuel delivery hose 136 outside of the dispenser 120 and a delivery nozzle 138. The nozzle 138 provides manual control of fuel delivery to the vehicle.

The dispenser 120 also includes a dispenser control system 140 having one or more controllers and associated memory 142. The dispenser control system 140 may receive volume data from the metering device 134 through cabling 144 as well as provide control of fuel delivery. The dispenser control system 140 may provide audible signals to a speaker 126 in order to provide various beeps, tones and audible messages to a customer.

The dispenser 120 is preferably equipped with a payment acceptor, such as a card reader 148 or a cash acceptor 150, along with a receipt printer 152. With these options, the dispenser 45 control system 140 may read data from the magnetic strip of a card inserted in the card reader 148 or receive cash from a customer and communicate such information to an attendant terminal (not shown), such as the G-SITE® controller sold by Marconi Commerce Systems, Inc., 7300 West Friendly Avenue, Greensboro, N.C. The attendant terminal typically communicates with a remote network (not shown), such as a card verification authority, to ascertain whether a transaction proposed to be charged to or debited from an account associated with the card inserted in the card reader 148 is authorized.

The dispenser 120 may include one or more types of displays, preferably one or more alpha-numeric displays 122 together with a high resolution graphics display 127. The graphics display 127 will generally have an associated keypad 128 adjacent to the display or integrated with the display to provide a touch interface. The dispenser 120 may include an additional, auxiliary key pad 156 associated with the card reader 148 for entering secret codes or personal identification numbers (PINs). Notably, the displays 122, 127 and keypads 128, 156 may be integrated into a single device and/or touch interface. The dispenser control system 140 is preferably comparable to the microprocessor-based control systems used in CRIND (card reader in dispenser) and TRIND (tag or transponder reader in dispenser) type units sold by Marconi Commerce Systems, Inc. under the trademark THE ADVANTAGE.

In the prior art systems, the loop antennas are mounted underneath the upper piping housing 159 or at the very top 160 of the fuel dispenser 120. As noted, this may interfere with the placement of desired corporate logos or other advertising, as well as be unsightly.

Loop antennas in general are well understood and operate at a frequency dictated by the inductance (L) of the loop and the capacitance (C) of the associated capacitor (not shown) according to the following equation:

$$f=1/(2\pi*\sqrt{(LC)})$$

The magnetic field strength is proportional to the product of the number of turns of the loop multiplied by the magnitude of the current in the coil. For maximum magnetic field strength, the current and the number of turns must both be maximized. The difficulty is that when operating from a limited power source, the factors involved make it difficult to maximize both, since they tend to be counterproductive. As the number of turns are increased, the inductance of the coil increases, the impedance of the coil increases, and the loop current drops due to the higher impedance of the coil. As the number of turns are decreased, the situation may result in more current due to lower inductance and lower impedance, but the turns have decreased, resulting in a lower magnetic field strength.

An additional concern for antennas and all radio frequency circuits is called "skin effect." Skin effect is a phenomenon which happens at radio frequencies whereby the radio frequency current will only flow proximate the outside of a conductor. As the frequency increases, the skin depth decreases to a point where the current is flowing only on the surface of a conductor. For example, at 130 kHz, which is approximately the frequency for the downlink antennas of the present system, the skin depth is approximately 0.007 inches.

Figure 1:
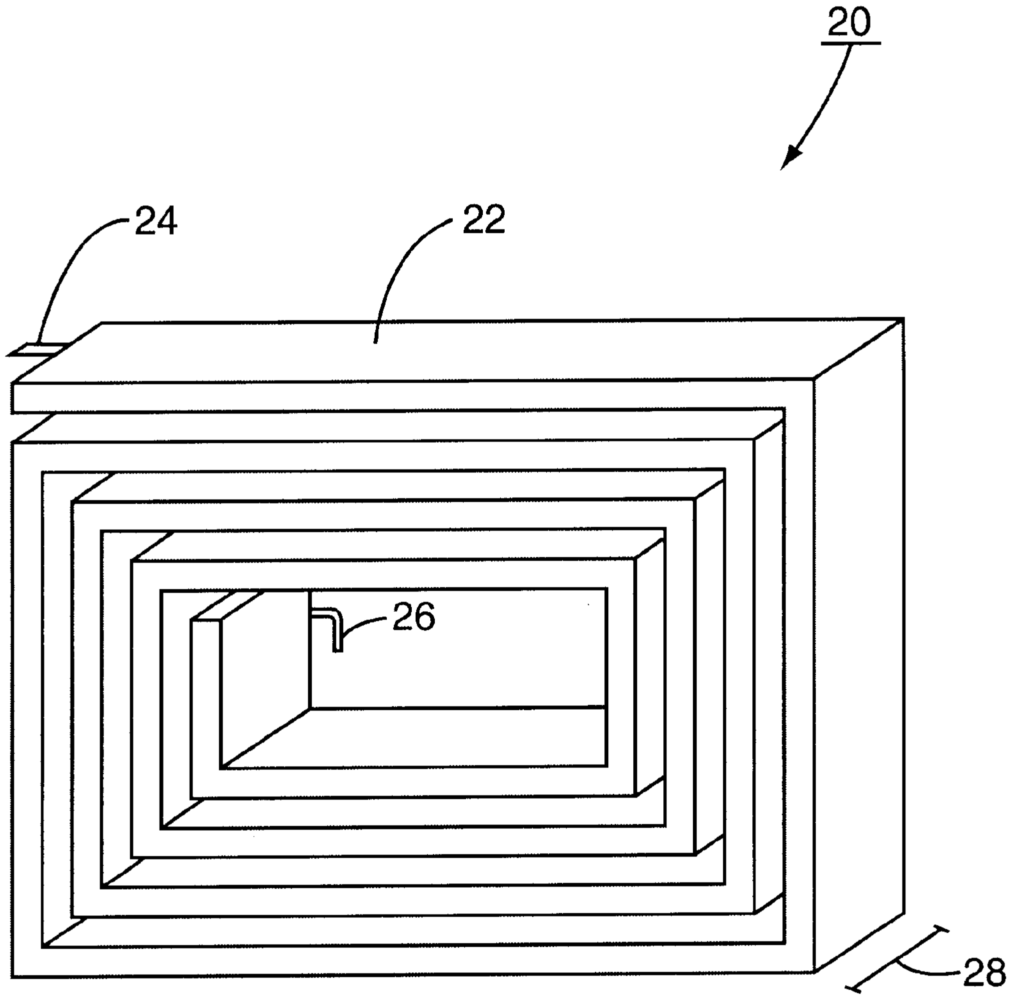
FIG. 1 shows an isometric view of the loop antenna of the present invention.
Figure 2:
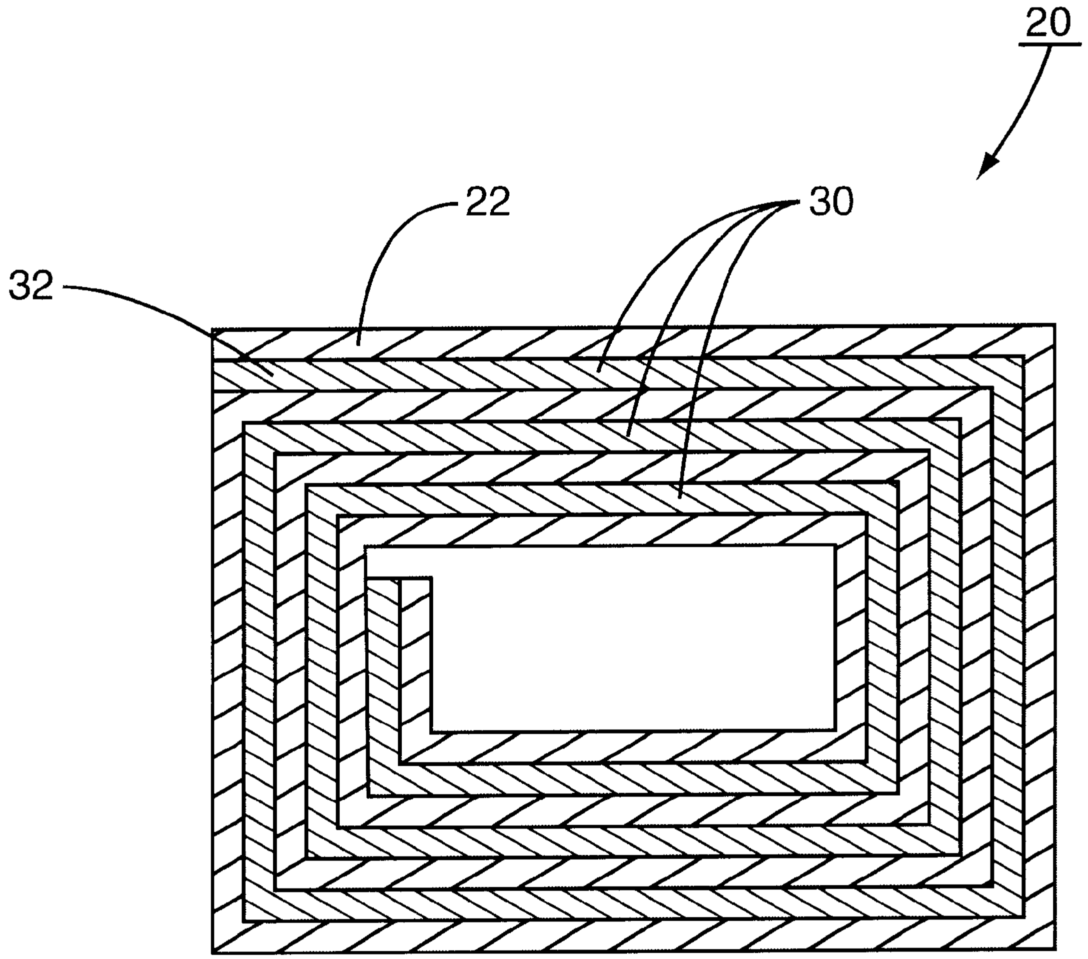
FIG. 2 illustrates a front elevational view of the antenna of FIG. 1 with a dielectric tape positioned within the coils.

The present invention solves these concerns by providing a loop antenna 20 as seen in FIG. 1. The loop antenna is preferably a flat conductor 22 coiled into a number of concentric turns 24, much like a tape measure. A pair of electrical leads 24 and 26 provide electrical connection from the loop antenna 20 to a communications electronics circuit 17 (FIG. 4) for control of the transmission and receipt of electromagnetic signals by the loop antenna 20.

The appropriate number of turns 24 in the loop antenna 20 is in part dictated by the space is limitations discussed above, although between one and fifteen turns would cover most embodiments, especially at the desired operating frequency of 134 kHz. However, in the preferred embodiment, between one (1) and ten (10) turns are used, although more turns may be used. For example, with appropriate circuitry modifications, one turn is possible and effective. Suitable conductors include copper, aluminum, gold and other well known electrically conductive materials. As always, the choice of conductor is dictated by engineering and cost effectiveness. Copper is a good conductor, but corrodes if exposed to weather and time. Aluminum does not corrode in a manner which affects the electrical properties, but is not as good a conductor. Gold does not corrode, and is a good conductor, but is extremely expensive. In the most preferred embodiment, the loop antenna 20 is formed from one turn of aluminum tubing and may be sized to provide the appropriate operative frequency.

The conductor 22 may be shaped into a wide, flat band prior to coiling. While the overall dimensions of the antenna 20 will be dictated by the geometry of its mounting discussed below, the generally acceptable width 28 of the conductor 22 is between about 1/16 and 1 inch (0.16–2.54 cm) and preferably between about ¼ and ½ inch (0.64–1.27 cm). The flat band is additionally preferred because it helps reduce or eliminate losses incurred by the skin effect. The thickness of the band is determined in part by the desired operating frequencies and the resulting skin effect. Additionally, this wide, flat band has a low DC resistance due to the substantial cross-sectional area. As the tubing in the preferred embodiment is relatively thin, losses incurred by the skin effect are eliminated or reduced. It should be appreciated that the tubing may be cylindrical or rectillnear as needed or desired.

In order to prevent electrical shorts between concentric turns 24, spaces 30 must exist therebetween. As seen in FIG.

Figure 3:
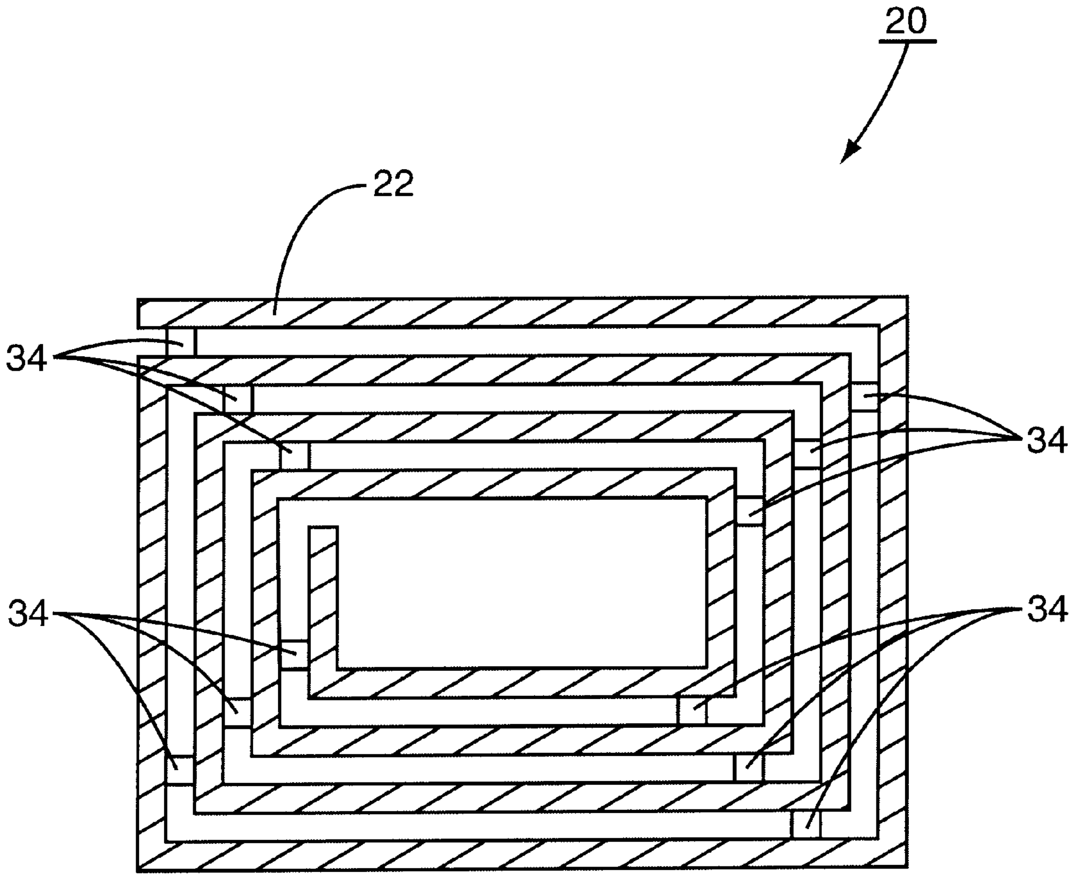
FIG. 3 demonstrates a front elevational view of the antenna of FIG. 1 with spacers positioned within the coils.

2, these spaces 30 may be formed by a dielectric tape 32. There will be a capacitive coupling between concentric turns 24 which will affect the operative frequency due to turns 24 close proximity if a dielectric tape 32 is used. To reduce this coupling, spacers 34 as shown in FIG. 3 may be used in addition to, or in place of, the dielectric tape 32. While the dielectric tape 32 may be as thin as approximately 0.001 inch, the spacers 34 are preferably around 1/32 to 1/16 of an inch thick. One of the advantages of the aluminum tubing in the preferred embodiment is the elimination of the need for spacers and a reduction in the molding concerns associated with molding the antenna 20 into a bezel as described below.

Figure 4:
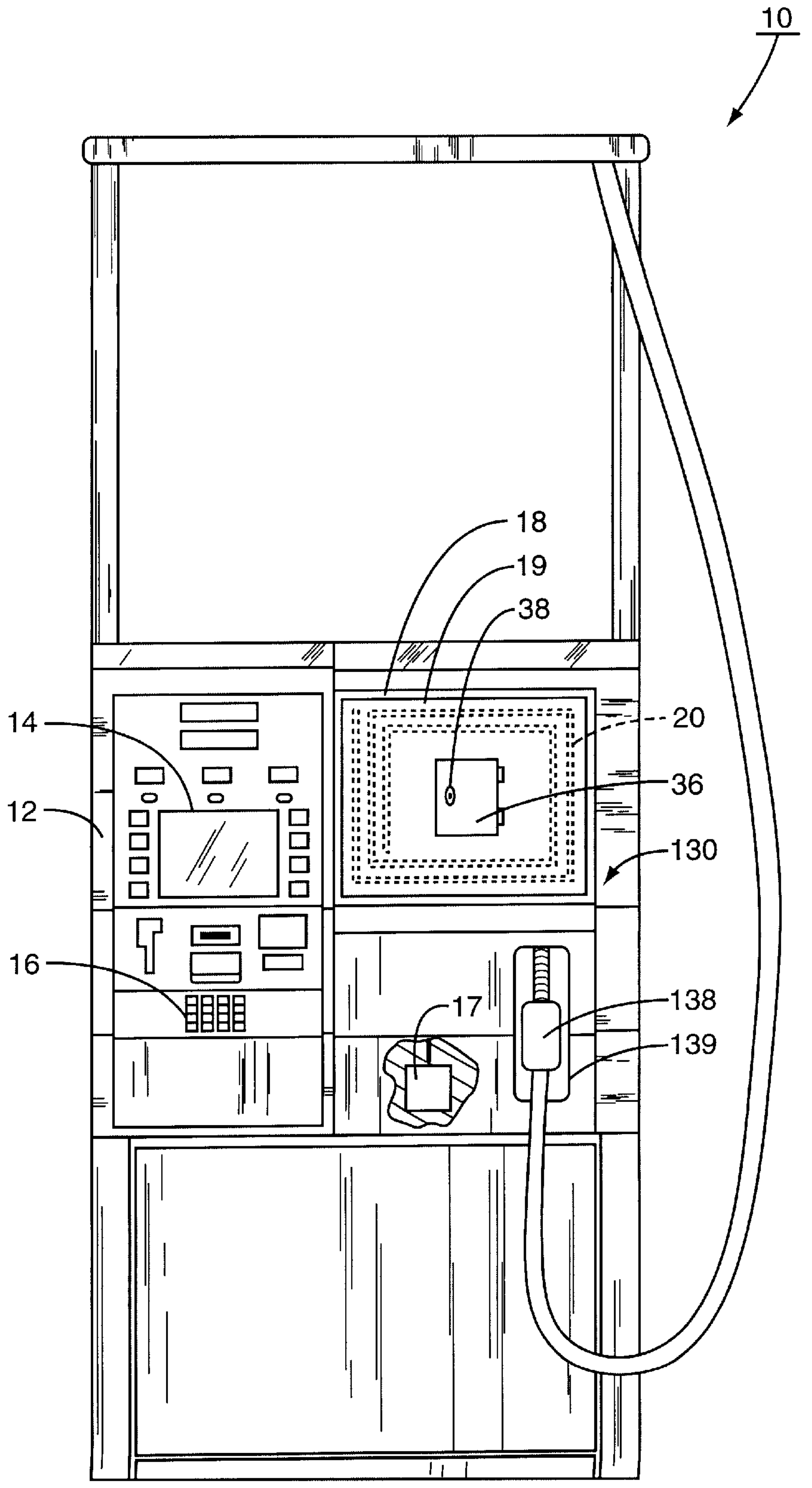
FIG. 4 pictures a front elevational view of a first embodiment of a fuel dispenser equipped with the loop antenna of FIG. 1.
Figure 5:
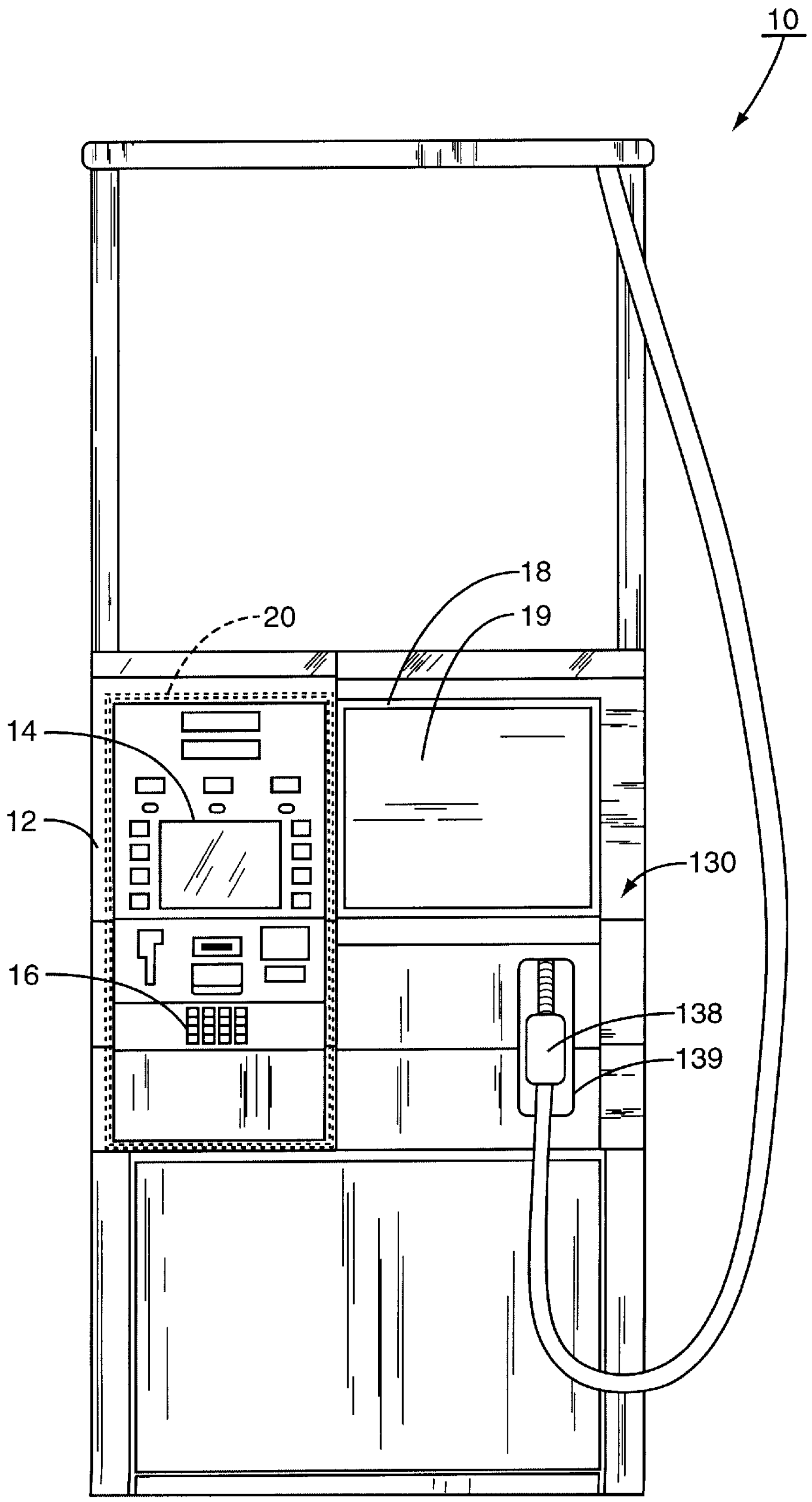
FIG. 5 depicts a second embodiment of a fuel dispenser equipped with the loop antenna of FIG. 1.
Figure 6:
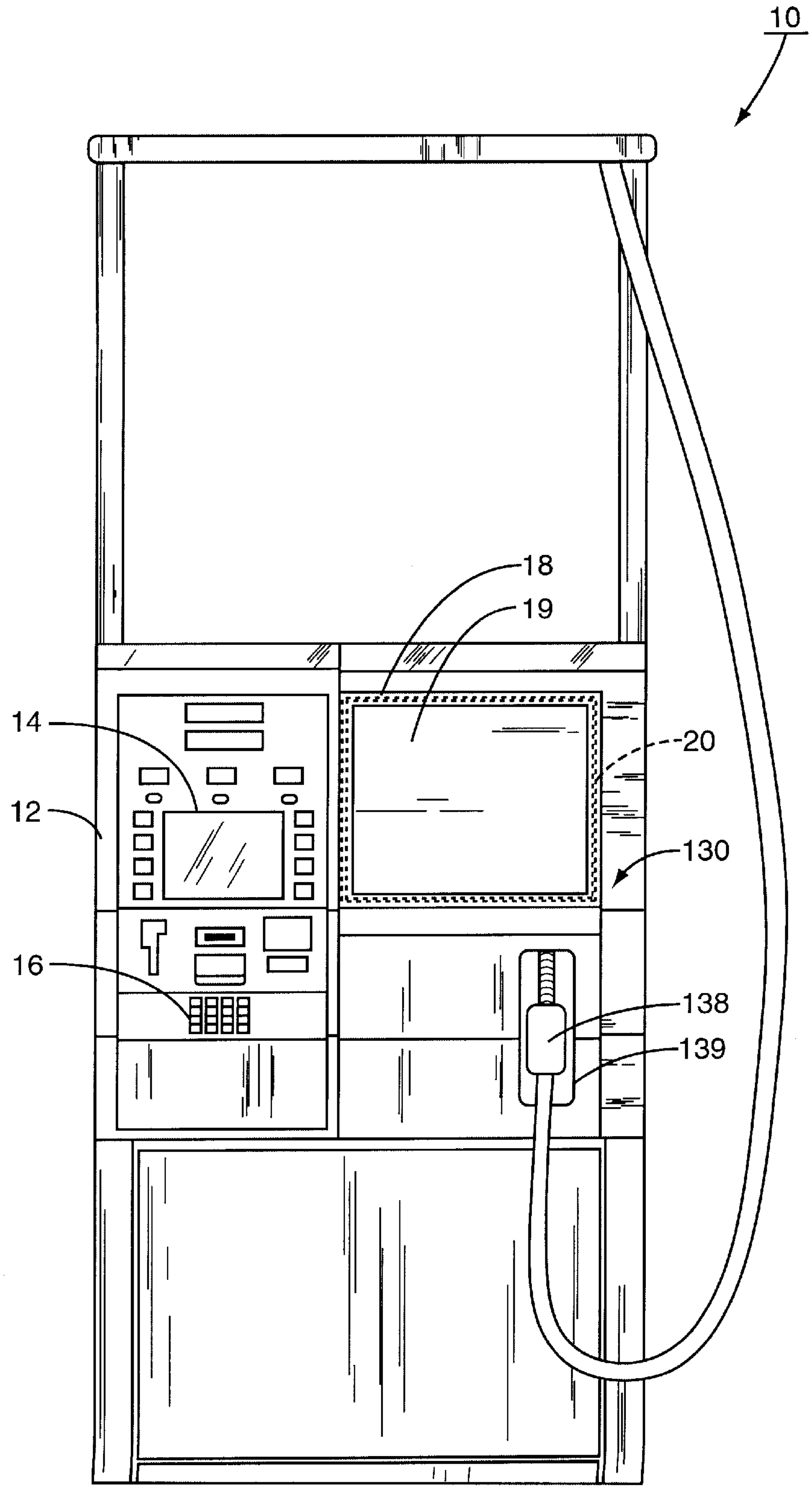
FIG. 6 features a third embodiment of a fuel dispenser equipped with the loop antenna of FIG. 1.

In contrast to the prior art loop antennas which were mounted on top surface 160 of the fuel dispensers 120 (FIG. 9), the present loop antennas 20 are mounted in the front face 130 of the fuel dispenser 10 as shown in FIGS. 4–6. The fuel dispensers 10 of FIGS. 4–6 are identical except for the placement of the loop antenna 20, and will be described only once.

Figure 7:
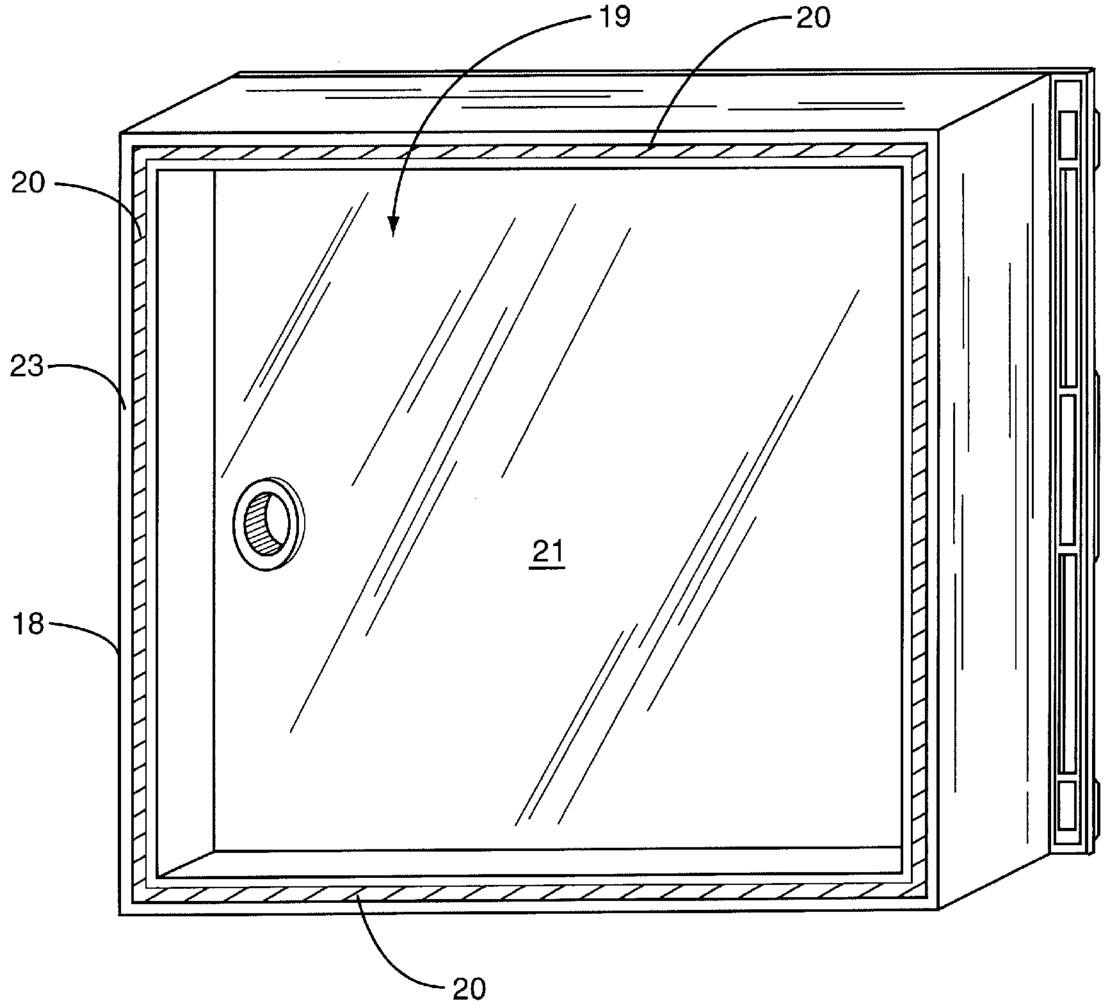
FIG. 7 shows an enlarged perspective view of the embodiment of FIG. 6.

Most fuel dispensers 10 include a bezel 12 which acts as a lip around a display 14 and a keypad 16. An additional bezel 18 may be positioned around a panel 19. The panel 19 may be adapted to show a logo, an advertisement or contain an access panel 36 for entry into the interior of the fuel dispenser 10. Lock 38 prevents unauthorized entry, and while shown with hinges, access panel 36 may be removable. In most cases, the bezels 12 and 18 are flush with the face 130 of the fuel dispenser, however, in certain embodiments, the bezels 12 and 18 may extend outwardly from the face 130, in effect forming a raised lip (FIG. 7). The loop antenna 20 of the present invention may be placed in one of several locations within the face 130 of the fuel dispenser 10.

In a first embodiment, the loop antenna 20 is integrally molded with panel 19 (FIG. 4). In a second embodiment, the loop antenna 20 is positioned within the bezel 12 surrounding user interface elements such as the display 14 and the keypad 16 (FIG. 5). In a third embodiment, the loop antenna 20 is positioned within the bezel 18 surrounding the panel 19 (FIGS. 6 and 7). A fourth embodiment (not shown) positions the loop antenna 20 around the nozzle mount 139. In all the embodiments, the loop antenna 20 is positioned within the face 130 of the fuel dispenser 10.

For a better understanding of how the antenna 20 may be positioned in a bezel, reference is made to FIG. 7, wherein the panel 19, the bezel 18 and the loop antenna 20 have been removed from the fuel dispenser and enlarged for clarity. In FIG. 7, the bezel 18 extends outwardly from the front surface 21 of the panel 19 and the loop antenna 20 is shown positioned within the bezel 18. This arrangement is particularly well suited for retrofitting on deployed fuel dispensers. It should be noted that the relative position of the antenna 20 within the bezel 18 does not change if the top surface 23 of the bezel 18 is flush with the front surface 21 of the panel 19.

It is within the scope of the present invention to position the loop antenna 20 within panels which are not surrounded by bezels or to put the antenna 20 within panels including other elements, for example, the keypad 16 and display 14. Furthermore, while generally rectilinear loop antennas are shown, it is within the scope of the present invention to use circular loop antennas with similar characteristics. Likewise, while in FIGS. 5–7, the antenna loop 20 is shown with just one loop, a plurality of loops as described can be employed in these embodiments.

It should be noted that for the purposes of the present invention, the above described positions are broadly defined as being positioned within an overbody. An overbody is easily adapted to be retrofitted onto existing deployed fuel dispensers and includes, doors, panels, surrounding bezels or add on pieces which are easily adapted for attachment to the face of a fuel dispenser such as fuel dispenser 10. Thus the present invention could be positioned in a deployed fuel dispenser without high cost. For example, an existing panel 19 would be removed from the deployed fuel dispenser and swapped with a panel 19 incorporating the antenna 20. The appropriate electrical connections are made and the dispenser is ready to dispense fuel once more. Or, another example of such a retrofit would be to create a bezel extending around the edge of a panel, such as panel 19, with the antenna 20 positioned within the bezel. Again the appropriate electrical connections are made and the dispenser 10 is ready. This requires the removal of no parts. Appropriate fasteners (not shown) would be needed to secure the new bezel to the old dispenser 10.

Regardless of position, the antenna 20 electrically communicates with communications electronics 17 (FIG. 4), which are preferably positioned within the dispenser 10. The communications electronics 17 are conventional and similar to those used in the Texas Instruments machines. The communications electronics 17 dictate the signal radiated by the antenna 20 and translate the signal received from the transponder by the antenna 20. Furthermore, the communications electronics 17 may serve the dual purpose of communicating with an outside network (not shown) for credit card verification, transponder account verification or the like as needed by the fuel dispensing environment.

In the first embodiment, shown in FIG. 4, where the antenna 20 is positioned within the panel 19, the panel 19 is preferably molded from an appropriate material with the antenna 20 therein. This may be accomplished by injection molding or insert molding as desired or needed. Of particular interest for injection molding is the use of spacers 34. The use of the spacers 34 allows the material used to mold the panel 19 to flow between the turns 24 of the conductor. As a result, in such instances the material of the panel 19 should be a good dielectric material. The material used to make the panel 19 should also be a good insulator to prevent accidental electrical discharge therethrough to a customer or the like. Since the resin used in the molding process has particular mold flow characteristics, the spacers 34 must be thick enough to allow the resin to flow into the spaces 30. Typically, a space of between about 1/32 and 1/16 of an inch will be enough for most resins used in a fuel dispensing environment. Thus, if a resin has different mold flow characteristics, the space 30 created by the spacers 34 could be changed to reflect the differing mold flow characteristics. Alternatively, if no spacers 34 are used, or if a single loop is employed, the material used to form the panel would just coat the antenna 20.

Similarly, in the alternate placements of the antenna 20 (FIGS. 5 and 6), the antenna 20 can be injection or insert molded as desired, or merely positioned within a hollow cavity within the bezel 12 or 18.

Figure 8:
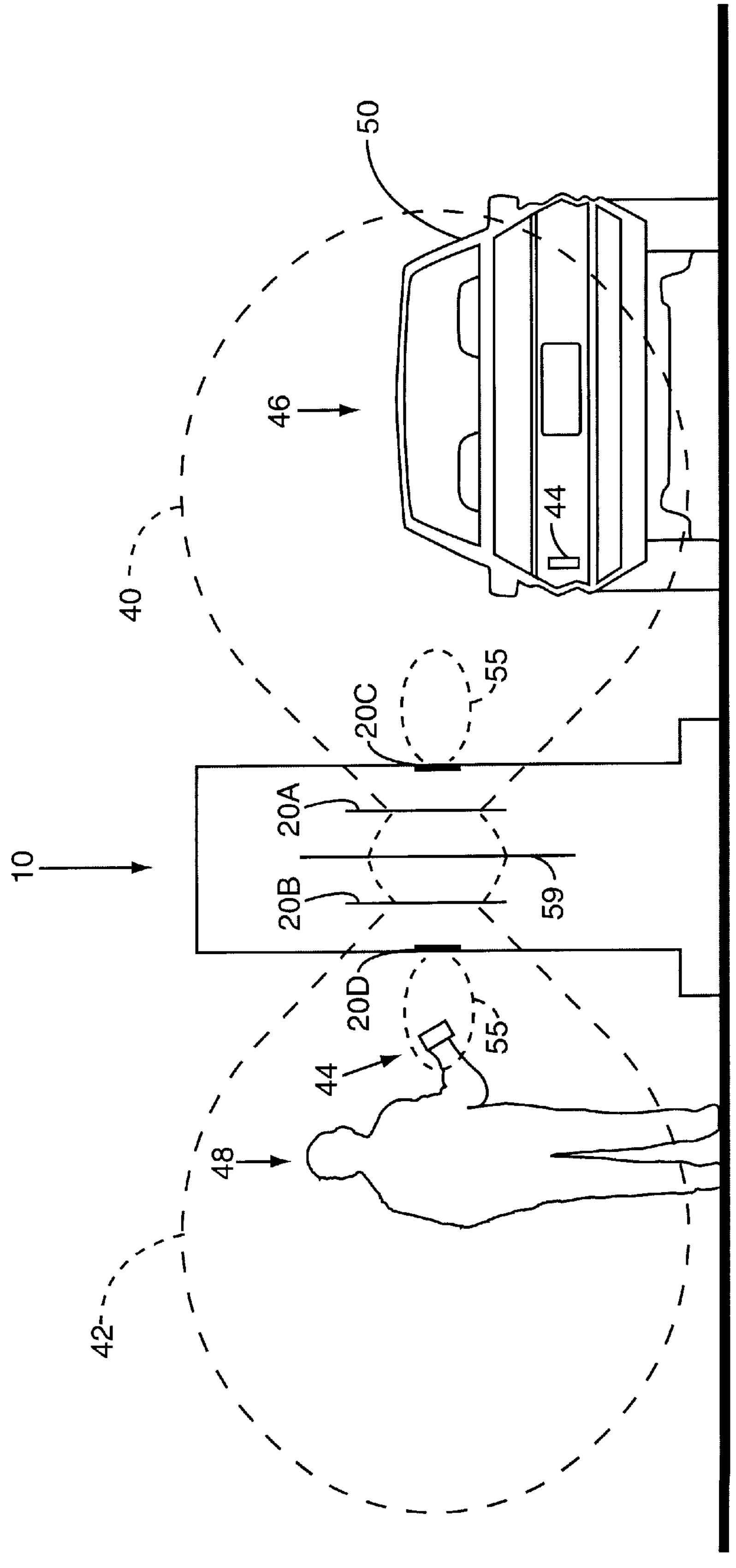
FIG. 8 illustrates a schematic view of a fuel dispenser of the present invention in use with transponders.

The present invention is seen in use in FIG. 8. As a function of the geometry of the loop antenna 20, two magnetic field lobes are created; however, existing metal 59 within the fuel dispenser 10 actually dampens one of the magnetic field lobes. Thus, as seen in FIG. 8, the antenna 20A creates magnetic field lobe 40, which is large enough to communicate with a transponder 44 carried in a vehicle 46. Additionally, the loop antenna 20B creates magnetic field lobe 42 which communicates with a transponder 44 carried by an individual person 48. Additional smaller loop antennas 20C and 20D may be used to create smaller magnetic fields 55, which may be more appropriate for reading handheld transponders, such as transponder 44 carried by an individual 48. It should be appreciated that all loop antennas 20A through 20D preferably communicate at approximately 130 kHz, and more preferably at 134.2 kHz. This arrangement allows discernment by the communication electronics 17 as to whether the transponder 44 is on the front or rear side of the dispenser 10. Additionally, the use of the smaller loop antennas 20C, 20D allows the customer to deliberately bring the transponder 44 into the smaller lobe 55 to prevent accidental or unintentional reading of the transponder 44 by the antennas 20. The communication electronics 17 discern which transponder 44 has been presented to which antenna 20 by multiplexing the sending and receiving of data from the various antennas. This arrangement is an optional arrangement and the fuel dispenser may be limited to two or four antennas as is needed or desired. In theory, one antenna 20 could be used for both sides of the fuel dispenser 10; however, such is not desired as confusion may result in which side of the fuel dispenser has been authorized to dispense fuel.

While not shown, the transponders 44 reply to communications from the loop antenna 20 at approximately 900 MHz, or 2.45 GHz. This reply communication is received at a conventional whip antenna (not shown). While it is possible that the transponder 44 respond at approximately 130 kHz, and thus eliminate the need for a whip antenna in the dispenser, this substitution would require a different antenna than is currently used in the transponders 44. This new antenna would be substantially larger than those presently in use in transponders 44 would, making the transponders 44 more cumbersome and bulky.

In the preferred embodiment, the lobes 40, 42 should be operatively strong enough to encompass an area expected to contain a car mounted transponder 44 during fueling. In the preferred embodiment, the electromagnetic waves used are in the radio frequency, although other frequencies may be acceptable. It should be appreciated that the transponder 44 may be positioned almost anywhere on the vehicle 46, but is preferably on the fuel tank side of the vehicle 46 to prevent interference from the body 50 of the vehicle 46.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a fuel dispenser including a bezel, said fuel dispenser for fueling a vehicle, the improvement comprising:

a) an overbody removably attached to said bezel; and b) a loop antenna positioned within said overbody for transmission of an electromagnetic signal from said fuel dispenser to said vehicle.

2. The fuel dispenser of claim 1 wherein said loop antenna is formed from a wide flat conductor.

3. The fuel dispenser of claim 2 wherein said conductor is formed from copper.

4. The fuel dispenser of claim 2 wherein said conductor is formed into a plurality of turns.

5. The fuel dispenser of claim 4 wherein said plurality of turns are concentric.

6. A method of communicating from a vehicle to a fuel dispenser, comprising:

a) providing a loop antenna within the face of the fuel dispenser;

b) providing a transponder on the vehicle; and c) generating an electromagnetic signal from said loop antenna which travels to said transponder.

7. The method of claim 6 further comprising the step of coiling the loop antenna into a plurality of turns.

8. The method of claim 6 further comprising the step of molding the loop antenna within an overbody attached to the face of the fuel dispenser.

9. The method of claim 8 wherein molding the loop antenna within an overbody attached to the face of the fuel dispenser comprises the step of fastening the overbody to a bevel in the face of the fuel dispenser.

10. The method of claim 6 further comprising the step of generating an electromagnetic signal from said transponder to said fuel generator.

11. A system for facilitating communication from a fuel dispenser to a transponder, said system comprising:

a) a fuel dispenser including a face; and b) a loop antenna positioned within said face.

12. The system of claim 11 wherein said loop antenna comprises a flat conductor.

13. The system of claim 12 wherein said flat conductor is coiled into a plurality of turns.

14. The system of claim 11 wherein said loop antenna is coiled into a plurality of turns.

15. The system of claim 11 further comprising an overbody, said loop antenna molded within said overbody, said overbody fastened to said fuel dispenser to form a portion of said face.

16. The system of claim 11 wherein said face comprises a bevel.

17. The system of claim 16 further comprising an overbody, said loop antenna molded within said overbody, said overbody fastened to said bevel to form a portion of said face.

18. An integrated antenna assembly for a fuel dispenser comprising:

a) a dispenser panel attachable to a fuel dispenser; and b) a loop antenna integrally molded within said dispenser panel, said antenna formed having a plurality of turns of a flat conductor.

19. The antenna assembly of claim 18 wherein said plurality of turns comprises between two and fifteen turns.

20. The antenna assembly of claim 18 wherein said conductor is between about 1/16 and 1 inch wide.

21. The antenna assembly of claim 20 wherein said conductor is between about ¼ and ½ inches wide.

22. The antenna assembly of claim 18 further comprising at least one spacer positioned between turns of said loop antenna to space consecutive turns one from the other.

23. The antenna assembly of claim 18 further comprising a dielectric material positioned between consecutive turns of said loop antenna.

24. The antenna assembly of claim 23 wherein said dielectric material is integrally molded with said dispenser panel.

25. The antenna assembly of claim 23 wherein said dielectric material is a dielectric tape.

26. The antenna assembly of claim 18 wherein said loop antenna is adapted to have an operative frequency of 134 kHz.

27. The antenna assembly of claim 26 wherein said loop antenna includes between two and ten turns.

28. A panel for a fuel dispenser comprising:

a) a body adapted for attachment to the fuel dispenser; and b) a loop antenna integrally molded within said body for transmission of electromagnetic signals.

29. The panel of claim 28 wherein said loop antenna comprises a plurality of concentric turns.

30. The panel of claim 28 wherein said loop antenna is adapted to have an operative frequency of 130 kHz.

31. A bezel for surrounding a panel on a fuel dispenser comprising:

a) a bezel body adapted for positioning on the fuel dispenser to surround the panel; and b) a loop antenna positioned within said bezel body for receipt and transmission of electromagnetic signals.

32. A fuel dispenser comprising:

a) a face including at least one movable panel; and b) a loop antenna for transmission of electromagnetic signals positioned within said face, proximate said panel.

33. The fuel dispenser of claim 32 wherein said loop antenna is integrally molded within said panel.

34. The fuel dispenser of claim 32 further comprising a bezel surrounding said movable panel, said loop antenna positioned within said bezel.

35. The fuel dispenser of claim 32 wherein said loop antenna comprises a plurality of concentric turns.

36. The fuel dispenser of claim 35 wherein said loop antenna further comprises at least one spacer positioned between said concentric turns.

37. The fuel dispenser of claim 36 wherein said spacer creates a space of approximately 1/16 inch between said concentric turns.

38. The fuel dispenser of claim 32 further comprising a second face including at least one movable panel; and a second loop antenna for transmission of electromagnetic signals positioned within said face, proximate said panel.

39. The fuel dispenser of claim 32 wherein said loop antenna is formed from one turn of aluminum tubing.

* * * * *